Sept. 29, 1964 G. H. ALLGEYER 3,150,562
APPARATUS FOR TRANSFER OF GLASSWARE
Original Filed June 5, 1958 4 Sheets-Sheet 1
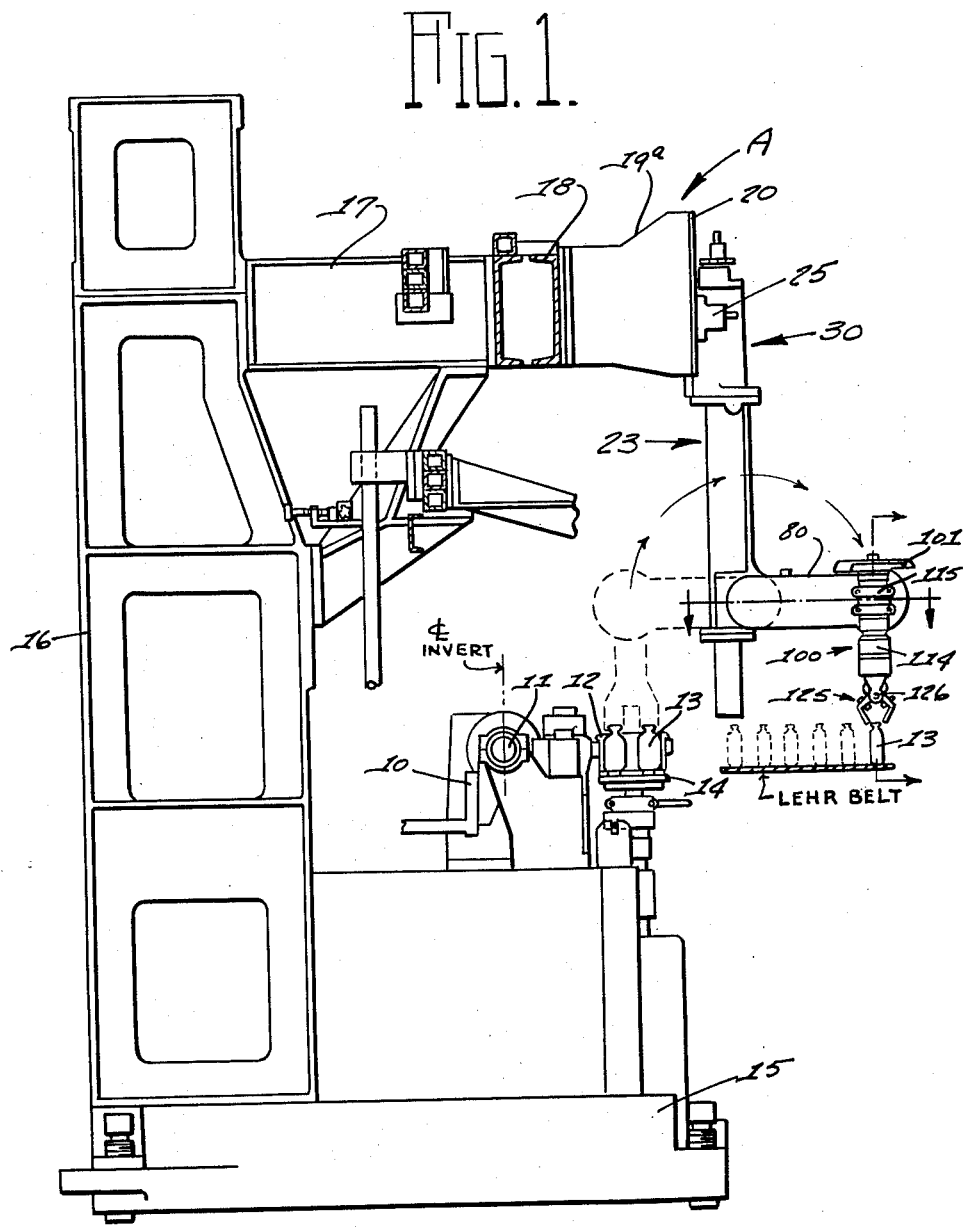
INVENTOR.
Guy H. Allgeyer
BY
J. R. Nelson, and
W. A. Schaich
ATTORNEYS Sept. 29, 1964  G. H. ALLGEYER  3,150,562
APPARATUS FOR TRANSFER OF GLASSWARE
Original Filed June 5, 1958  4 Sheets-Sheet 2
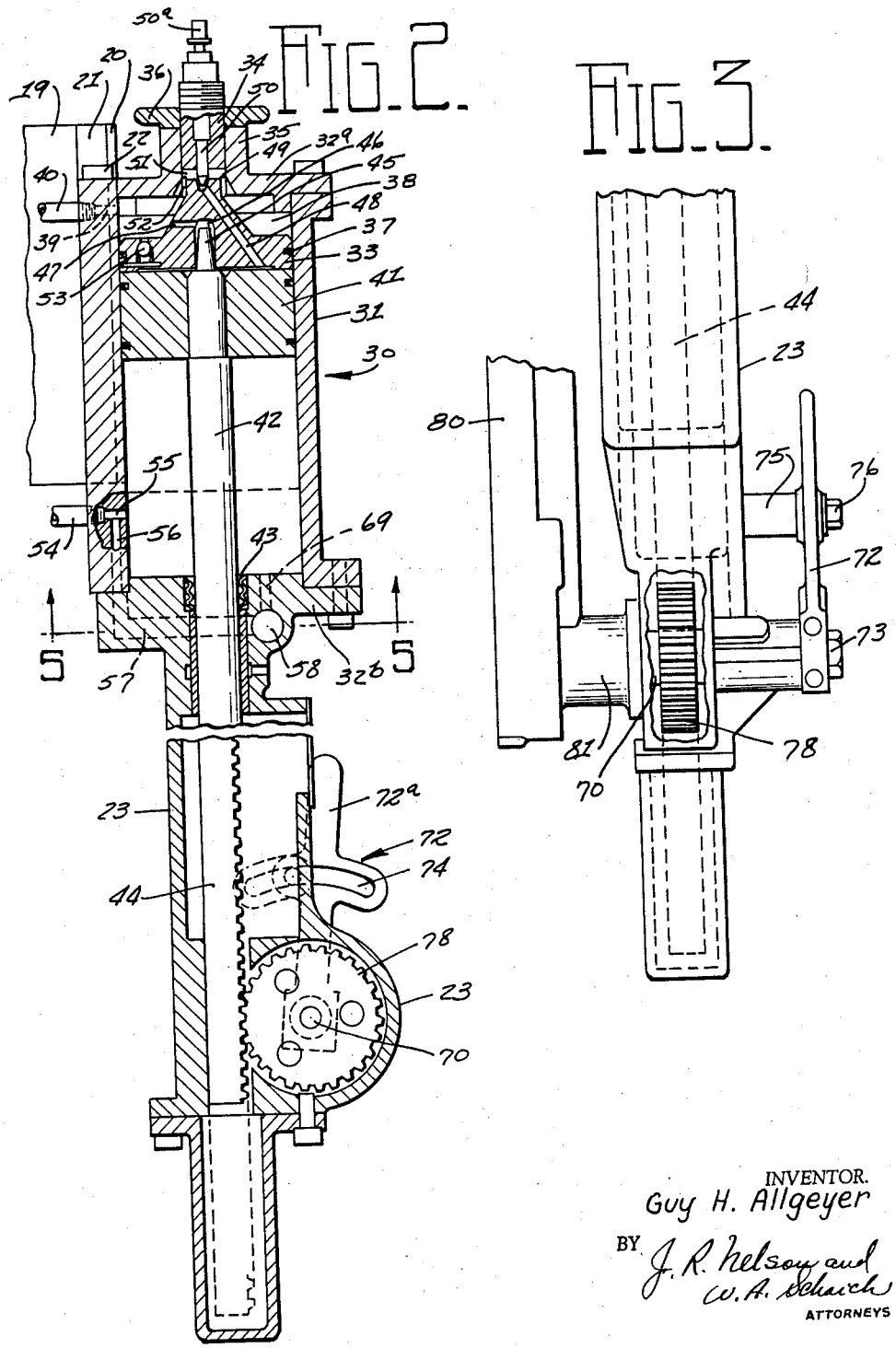
INVENTOR.
Guy H. Allgeyer
BY
ATTORNEYS

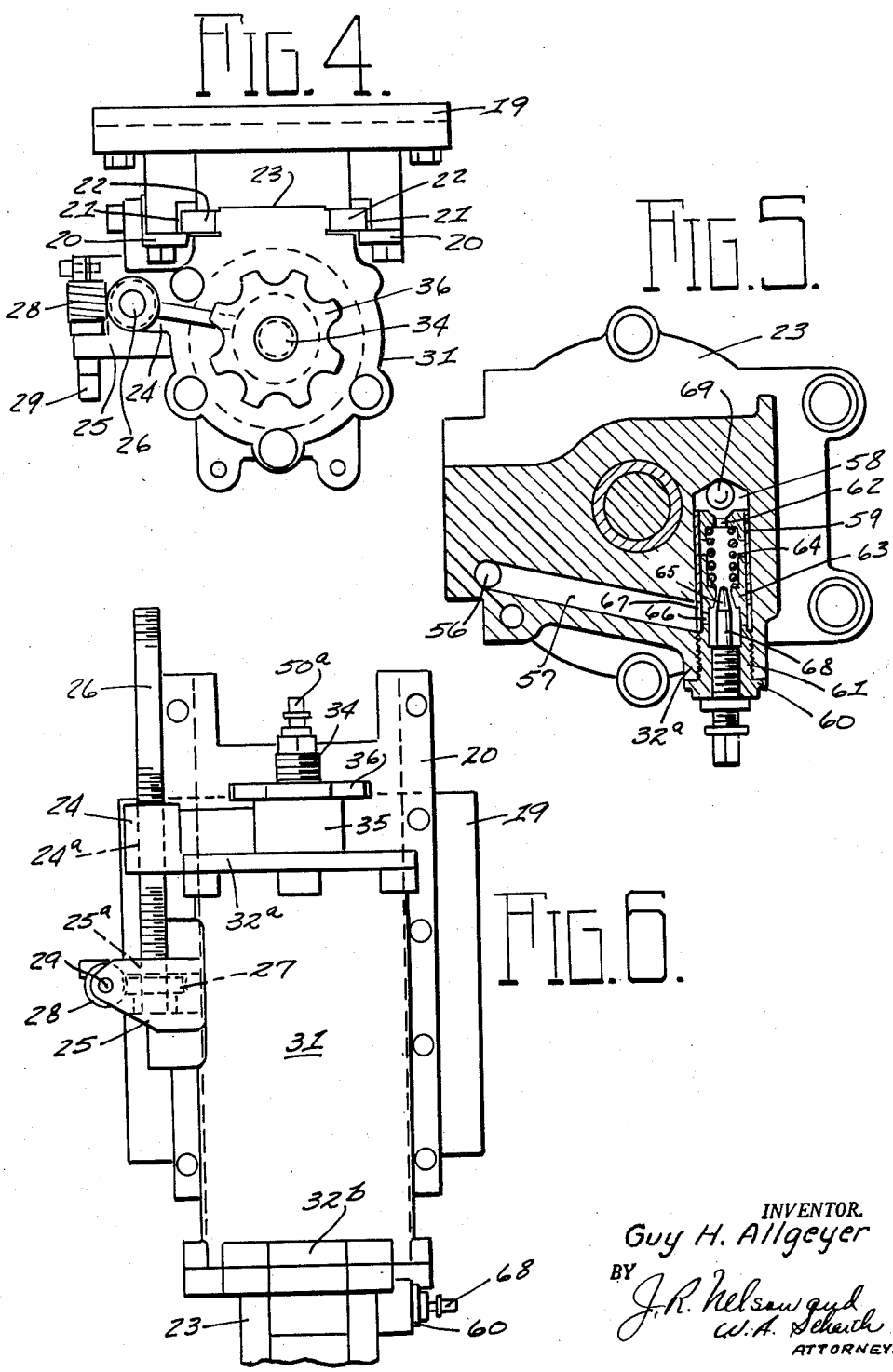

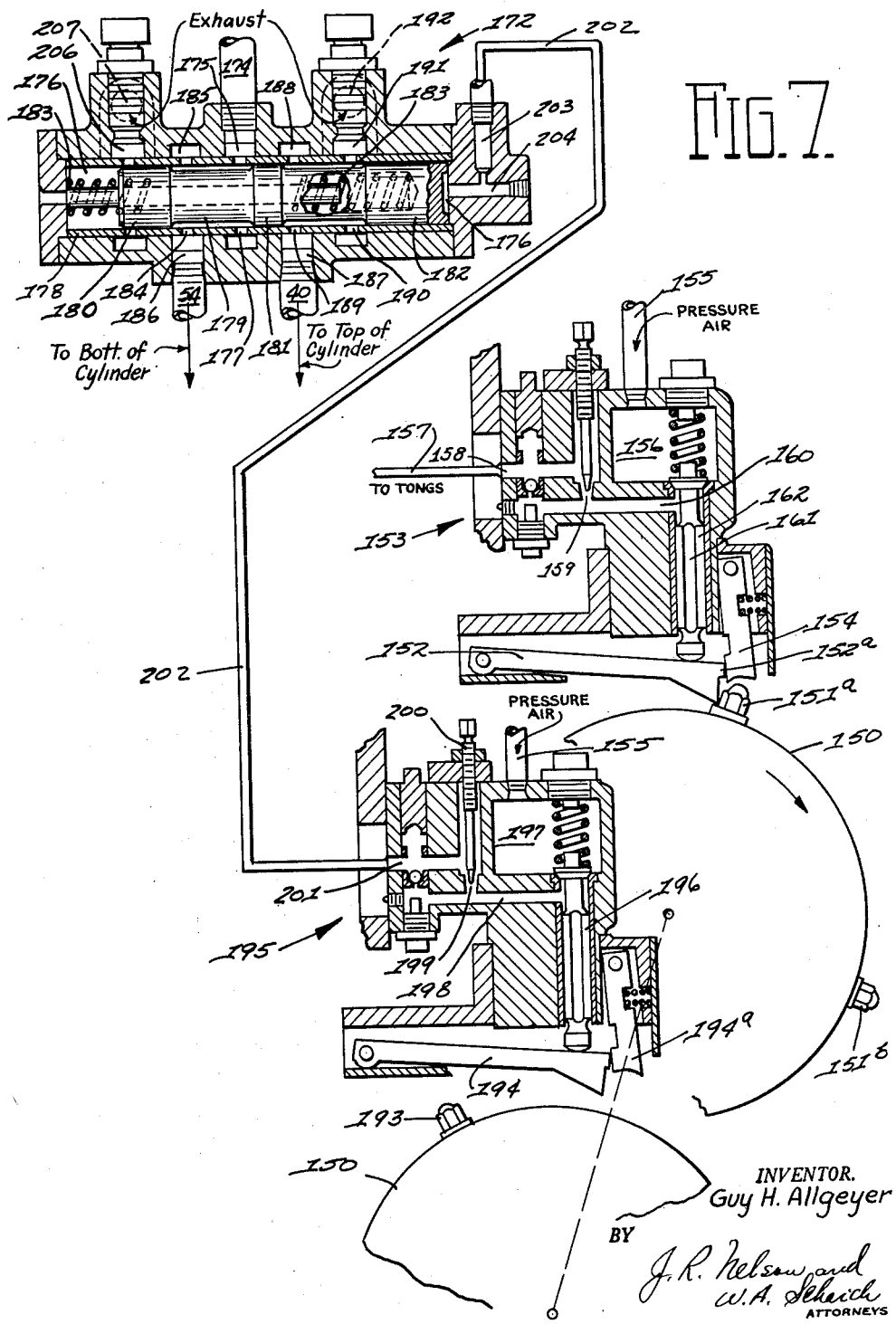

United States Patent Office 3,150,562
Patented Sept. 29, 1964

3,150,562
APPARATUS FOR TRANSFER OF GLASSWARE
Guy H. Allgeyer, Godfrey, Ill., assignor to Owens-Illinois Glass Company, a corporation of Ohio
Original application June 5, 1958, Ser. No. 740,020, now Patent No. 3,066,786, dated Dec. 4, 1962. Divided and this application Sept. 21, 1962, Ser. No. 225,297
2 Claims. (Cl. 91—26)

The present invention relates to handling glassware articles formed by machine, and is more particularly related to new and improved mechanism for transferring successively formed glassware articles from a receiving station, such as the finishing mold bottom plates of the machine, to a delivery station, such as a moving conveyor of a lehr, and depositing them thereon in a predetermined orientation.

The present application is a divisional of my copending application Serial No. 740,020, filed June 5, 1958 and entitled "Apparatus for Handling Glassware Articles," which issued as U.S. Patent No. 3,066,786, issued December 4, 1962.

In operation of modern day glass forming machines, such as the well-known Hartford-Empire I.S. machine hereinafter illustrated in connection with a specific example of the machine to which the invention is applicable, such machines are made up of a plurality of side-by-side sections in a bank or longitudinally aligned spaced apart group of ware forming mechanisms. To obtain transfer from these forming mechanisms to a lehr conveyor traveling longitudinally along the side of the machine, the articles need be distributed laterally across the lehr in a plurality of rows to permit the lehr conveyor to travel at slow linear speeds consistent with satisfactory annealing practice, yet handling the ware in step with the machine without creating jam-ups.

An object of this invention is to provide improved adjustable means for cushioning the end portions of the oscillating movement of the tongs of the transfer device, one such cushioning occurring just prior to the arrival of the tongs at the mold position to grip the ware there supported and other cushioning occurring just prior to the arrival of the tongs at the position overlying the delivery station where the ware is released.

Another object of the invention is to provide an improved mounting for the transfer device on the overhead frame of the forming machine, the mounting including a vertical adjustment for setting the vertical elevation of the tongs over the receiving and delivery stations to the proper operating elevation.

Another object of the present invention provides a safety feature to prevent jam-up or interference between the transfer device and the mold mechanism of the machine in the event of pressure failure or shut-off of pressure in the control circuit for timing movements of the device in time with machine operation.

Other objects and advantages of the present invention will become apparent from a reading of the following description of various practical embodiments, the appended claims, and the accompanying drawings of these embodiments to which reference is made and in which:

FIG. 1 is a side elevational view, partly in section, of one section of a well-known Hartford-Empire I.S. glass forming machine.

FIG. 2 is a sectional elevational view of the cylinder-piston drive motor mechanism of the transfer device of the invention.

FIG. 3 is a front elevational view, partly broken away, of the drive connection between the motor and the transfer arm for swinging the transfer arm of the transfer device about a horizontal axis and is illustrated as it would appear if viewed from the front of the forming machine.

FIG. 4 is a plan view of the drive motor of FIG. 3 and illustrates the novel mounting for the motor on the overhead frame of the forming machine including the provision of vertical adjustment for the ware transfer device of this invention.

FIG. 5 is a sectional plan view, taken along line 5—5 of FIG. 2.

FIG. 6 is a front elevational view of the motor mounting on the frame of the forming machine and is projected from the plan view of FIG. 4.

FIG. 7 is in part, a schematic piping diagram showing the control valves for controlling the operation of the ware transfer device for effecting its swinging movement and its opening and closing movement of the ware gripping tongs, both in timed relation with the operation of the section of the I.S. machine on which the transfer device is being utilized.

The present invention, in one novel form, is adapted to take formed ware from a finished blow mold of a forming machine, as herein illustrated, and put it directly onto a moving belt of a lehr conveyor which is arranged to travel past the molds and thence through an annealing lehr. This transfer is accomplished without intermediate handling of the ware. In the case of multiple section operation of forming machines, such as the Hartford-Empire I.S. type machine, which today is one of the widely used forms of machines in glass bottle plants, this lehr loading operation necessitates the performance of various functions for orienting the ware on the conveyor as well as providing the proper transfer, as is accordingly provided by this invention.

The bottles are brought in succession to the ware receiving position, which in the illustration hereinafter described comprises the mold bottom plates, and supported upright thereat ready for transfer. The articles are then grasped and held by transfer tongs and removed from the mold bottom plates in succession for transfer to a horizontally spaced receiving station, this station being herein illustrated as a moving lehr conveyor. This transfer requires both vertical and horizontal movement to clear the mold without interference and to perform the transfer. During the transfer, the ware is held upright.

The apparatus of the present invention will be more apparent from the following description of the apparatus and its mechanical aspects, as illustrated on the drawings just referred to. On the drawings, FIG. 1 illustrates one working form of the apparatus of the present invention being employed on an I.S. machine section designated by reference letter A. The forming mechanism comprises a gob delivery mechanism, a blank mold, and cooperating neck ring, none of these being shown but may be readily understood by reference to U.S. Patent No. 1,911,119, issued to H. W. Ingle. The neck ring is carried on an invert mechanism 10 which is pivoted sequentially about a pivot 11 to successively bring the blank or parison shapes of glass to the final blow molds 12. The blow molds 12 are operated to open and close and form finished containers 13. The formed containers are supported on mold bottom plates 14 in an upright position so that their central axes are vertical. The I.S. machine section, as illustrated on FIG. 1 is equipped for double gobbing operation.

The forming machine includes a base 15 on which all ware forming mechanisms are supported. The machine has a pair of vertical end frame structures 16 connected to the base 15. Appended to the vertical frame 16 are horizontal brackets 17 which support a longitudinally disposed overhead beam or frame member 18, the latter being parallel to the longitudinal alignment of the finishing molds 12 of the machine. Opposite and overlying the forming mechanism A is a corresponding bracket member 19a. The bracket will vary in length from one section to the other so that the brackets extend horizontally and longitudinally from the overhead frame 18 at varying distances.

At the outer end of each bracket member is an adjustable mounting for attaching a glassware transfer device, which will be later described in detail herein. At the outer end of bracket 19a (FIG. 1) is a vertical slideway 20 rigidly connected thereto (see FIGS. 2, 4 and 6). The slideway 20 provides opposed grooves 21 which receive T-slides 22 integrally connected with a vertical frame casting 23 of the transfer device. The frame 23 is integrally connected with the cylinder-piston motor of the transfer device, and will be presently described hereinafter. As seen in FIGS. 4 and 6, a threaded boss 24 is integrally connected to the vertical frame casting 23 of the transfer device and has its threaded central bore 24a vertically disposed and parallel to the slideway 20. A lug 25 is integrally connected with the slideway 20 on bracket 19 so as to be stationary. Lug 25 has a vertical bore 25a which receives a threaded shaft 26, the upper end of shaft 26 being threaded through the threaded portion 24a of boss 24. A pinion 27 is keyed onto the lower end of shaft 26 and is in mesh with a worm gear 28 fixed on a shaft or pivot 29 of lug 25. The vertical position of the transfer device is adjusted by turning shaft 29 and worm gear 28 in the appropriate direction. This will raise or lower the entire transfer device within the vertical slideway 20.

Referring again to FIG. 1, each transfer device is made up of a vertical frame casting 23, as just mentioned, and integrally connected as a part of this frame is the cylinder piston motor designated generally at reference numeral 30. This motor 30 is shown in detail on FIG. 2 and comprises a cylinder 31 having a head-end casting 32a and a bottom-end casting 32b which close the opposite ends of the cylinder. In the head-end of cylinder 31 is an adjustable head-end member 33 having an upstanding shaft portion 34 journaled in a bearing 35 which is part of the head-end casting 32a. The end shaft 34 is threaded and held in position by a collar 36 having matching threads engaged on the outer end portion of the shaft 34. The head-end member 33 has piston rings 37 which maintain the inner operating portion of cylinder 31 fluid-tight. The vertical adjustment of head-end member 33 is accomplished by turning collar 36 in the proper direction. This will either cause the head-end member 33 to be raised or lowered and serves to adjust the operating length of the cylinder 31. Between the head-end casting 32a and head-end member 33 is a fluid chamber 38 which communicates with the cylinder port 39. Port 39 is threaded to connect fluid conduit 40 which is part of a pressure fluid system to be later described herein.

The motor 30 includes a piston 41 in the cylinder and has a downwardly extending piston rod 42. The piston rod 42 extends through a fluid-tight gland 43 in the bottom-end casting 32b of the cylinder and at its lower end portion has an integrally connected rack segment 44. At the opposite end of the piston 41 is a tapered pin 45 concentric with piston rod 42. The head-end member 33 has a cylindrical bore 46 which registers with the tapered pin 45, the diameter of the bore being just slightly greater than the largest diameter of the pin. The innermost end of the cylindrical bore 46 is connected to chamber 38 by a radial passage 47. Another fluid passage 48 is formed in the head-end member 33 and extends from within the cylinder to a needle valve chamber 49. An axially disposed needle valve 50 is threaded for adjustment in the upper shaft portion 34 of the head-end member 33 and is turned by its outer head-end 50a. The needle valve 50 may be adjusted with respect to its seat in the needle valve chamber 49. The upper end of this chamber communicates with a radial slot 51 and slot 51 connects with chamber 38 through the annular space 52. A one-way ball-type check valve assembly 53 is provided in the head-end member 33 to permit only incoming flow of pressure fluid to the cylinder.

The bottom-end of the motor is connected to the fluid pressure system by conduit 54 connected to radial cylinder port 55. This port 55 is positioned axially from the bottom-end of the cylinder by a distance less than the axial dimension of the piston 41 so that when the piston approaches its lowermost position during its downward stroke, the port 55 will be closed. Port 55 also connects to the cylinder through a vertical passage 56 which communicates with a horizontal passage 57 connected to a cylindrical valve chamber 58. Thus, when the piston closes radial port 55, passages 56 and 57 together with the port 55 form a fluid connecting means between the valve chamber and the fluid pressure line 54. As seen on FIG. 5, the valve chamber 58 houses a cylindrical fixed member 59 which fits snugly therein and is held in position by the threaded cap 60 screwed into thread 61 in the bottom-end casting 32a of the cylinder. The innermost end portion of the fixed member 59 divides the valve chamber into two parts and a passage 62 is provided through this inner end of member 59 to connect these parts of the chamber. A cylindrical member 63 is mounted inside the sleeve portion of member 59 for limited axial sliding movement between extended and retracted positions. The movable member 63 is held in its extended position (as shown on FIG. 5) by compressed coil spring 64. The movable member has an axial passage 65 with an outlet 66 in register with a bore 67 through the side of the fixed member 59, the bore 67 communicating with the horizontal passage 57. An adjustable needle valve 68 is threaded through the cap 60 and is positioned to restrict the flow of fluid through the axial passage in the movable member 63 while the latter is held in its extended position. A bottom fluid port 69 in the cylinder 31 is connected to the end of the valve chamber 58 opposite passage 57.

Near the lower end of the frame 23 of the transfer device is a horizontal shaft 70 (see FIGS. 2 and 3). Shaft 70 has a squared end portion and a wrench 72 fitted onto the squared portion. The outer end of shaft 70 is threaded and a nut 73 holds the wrench in place. The wrench 72 has a handle 72a with an arcuate slot 74. The slot 74 aligns with the casting 75 which is threaded to receive a bolt 76. The bolt 76, when inserted through the slot 74 and tightened in the casting 75, attaches the wrench 72 rigidly to vertical frame 23 of the transfer device. This provides for maintaining the shaft 70 in a fixed position. The shaft is housed in the frame 23 in a bushing 77 and this bushing is dovetailed in the frame 23 to maintain the axial positioning of the shaft. A pinion gear 78 is connected to a drive bushing 83 journaled about shaft 70. The pinion gear 78 is in mesh with the teeth of the rack segment 44 on the piston rod of the motor 30 and is driven in either direction by the vertical reciprocating motion of the rack gear 44. The pinion gear 78 is bolted integral with the arm casting 80 of the transfer device at its hub 81 so that rotation of gear 78 carries the arm 80 with it.

Referring briefly to FIG. 1, a tongs mechanism 100 is mounted at the outer end of the transfer arm 80 of the transfer device. The upper part of the tongs mechanism 100 includes a Geneva drive unit comprising a bevel-gear Geneva driver 101 in mesh with a beveled gear tooth element or segment rigidly held on the outer end of the transfer arm 80. The Geneva driver 101 is pivoted on a vertical shaft which is an integral part of the mechanism 114. The tongs 125 operate in opposed pairs to open and close about the necks of ware 13 and are normally held in their open position.

Having just described the mechanical aspects of the various parts of the transfer device of this invention, the fluid circuit and controls for actuating the transfer arm and mechanism will now be described.

With particular reference to FIG. 7 and occasional cross-reference to FIGS. 2 and 5, it is seen that reference numeral 150 designates the rotatable timing drum of the timing device of the I.S. forming machine. The drum 150 is driven in one direction of rotation and at a constant speed to actuate various poppet type valves that regulate the forming cycle of the glass forming mechanism of the machine. In the present invention, one position on the I.S. timing drum 150 is utilized to mount buttons 151a and 151b which are rotated in alignment with a valve control lever 152 of a tong operating valve, referred to generally as 153. Valve 153, as shown, is a standard poppet-type valve mechanism used for controlling other operations on the I.S. machine, and briefly described comprises a fluid connection 155 from a source of fluid under pressure to a pressure chamber 156. As shown, the valve is positioned for exahust of fluid from the tongs mechanism through a circuit, to be presently described, and into a fluid line 157, thence through a passage 158 past a needle valve opening 159, into a passage 160 and through a groove 161 in the valve member 162 and exhaust to atmosphere. After sufficient rotation of the timing drum 150, the "low" valve button 151b engages the lower side of valve lever 152 which forces the lever upwardly and its end portion 152b engages the spring loaded latch 154 so that the lever is held in the "up" position and valve member 161 is lifted from its seat in chamber 156. The fluid pressure is then transmitted through the valve and into conduit 157 leading to the cylinder of the motor of the tongs mechanism 100. The pressure is kept on until the "high" valve button 151a advances to engage and lift the valve lever 152 and unlatch it from the latch 154, whereupon the valve member 161 is set by spring force to again exhaust fluid from the tongs motor.

Conduit 157 makes a fluid connection to the tongs by its connection to the tongs mechanism 100 for operating the piston within the cylinder chamber of the sleeve holder 114. When the pressure is connected by the valve 153 to the line 157 the piston is driven in a direction to close the ware holding tongs 125. On the other hand, the valve 153 is set to exhaust air through the described fluid passages and through the valve 153. Thus, the tongs mechanism is positively controlled to close under pressure by the separate valve 153. The tongs are normally opened under spring pressure. Therefore, a failure in the pressure circuit while operating the tongs during transfer will automatically actuate the tongs to "open" position and release the ware, thereafter eliminating interference upon successive transfer movements.

The motor 30 (FIG. 2) which drives the transfer arm 80 through its swinging movement is operated under the controlled fluid-actuated valve 172. A valve 172 for drive motor 30 of the transfer device corresponding to the machine section A is mounted on the overhead frame 18. The valve receives pressure fluid through individual conduit 174 connected to the valve inlet 175 (FIG. 7). The inlet 175 communicates with the cylindrical valve chamber 176 through openings 177 in the valve sleeve 178 which is inserted in the valve chamber. A hollow valve spool 179 is housed in valve chamber 176 and is axially shiftable in sleeve 178. The valve spool 179 has three axially disposed annular lands 180, 181, and 182, reading left to right on FIG. 7. A coil spring 183 is housed in the hollow core of valve spool 179 and compressed between the innermost end of the core and the end wall of the valve chamber. The spring 183 sets the valve spool 179 to its right hand position on FIG. 7 so that fluid pressure from line 174 enters the valve chamber 176 and is distributed therein between lands 180 and 181. The pressure fluid passes through openings 184 in valve sleeve 178 and into annular passage 185. The annular passage 185 communicates with cylinder port 186 of the valve and at this setting introduces pressure fluid to conduit 54. Conduit 54 is connected to the radial port 55 (FIG. 2) near the bottom end of the cylinder of motor 30.

The valve 172 being spring set to this position normally connects motor 30 to the pressure fluid in the line 174 when piston 41 is in its lowered position at the bottom end of cylinder 31 (dotted outline in FIG. 2). The fluid enters port 55 and, since the piston blocks this port to the cylinder, the fluid is conducted through passages 56 and 57, and enters valve chamber 58 through openings 66 and 67 (FIG. 5). The pressure shifts the movable member 63 of the valve to its retracted position against spring 64 and unseats the needle 68 from passage 65. The pressure is then conducted through the bottom end port 69 of the cylinder to drive the piston 41 upwardly (FIG. 2). Movement of the piston in this direction will drive the pinion gear 78 in a clockwise direction on FIG. 2 and swing the arm 80 of the transfer device in the same direction. For example on FIG. 1, transfer arm 80 will be swung from its position over the molds 12 at the ware receiving station to a position approximately 180° in the clockwise direction and over the lehr belt at the ware delivery station.

As piston 41 is moved toward the head-end of the cylinder 31, fluid above the piston is freely exhausted through bore 46 in the head-end member 33, passage 47, cylinder port 39 and conduit 40. Conduit 40 extends to a connection with valve port 187 which communicates with an annular chamber 188 in the valve 172 (FIG. 7). Chamber 188 is connected to the main valve chamber 176 through openings 189 in sleeve 178. The exhausted fluid is conducted between lands 181 and 182 of the valve spool and enters openings 190 connected with an annular exhaust chamber 191 connected to an exhaust port 192.

During the initial part of the piston movement, the pressure fluid introduced through bottom port 69 (FIG. 2) accelerates the piston gradually so that the ware is gradually lifted from the mold bottom plates 14 (FIG. 1), but after the piston uncovers radial port 55 of the cylinder (FIG. 2), its movement is accelerated relatively rapidly while driving the transfer arm 80 through the major portion of its swinging movement. Fluid above the piston is freely exhausted through bore 46 in the cylinder head-end member 33. But, near the end of the stroke, the arm is gradually brought to rest over the delivery station as follows:

The tapered pin 45 begins its entry into bore 46 and initiates a restriction of the exhaust of fluid. As the pin progresses farther into the bore, restriction of the exhaust is progressively increased until it is shut-off completely. Exhaust fluid must then be conducted through passage 48, but this flow is restricted by the adjustment of needle valve 50 in its seat 49. Near the end of the stroke, all of the exhaust must be through passage 48 regulated by needle valve 49–50. This cushions the ware transfer and permits the ware to be delivered gently to the lehr conveyor.

Referring again to FIG. 7, the motor valve 172 is shifted to an alternate setting for driving the piston of motor 30 downwardly (FIG. 2) by fluid pressure. With the piston driven to the head-end of the cylinder of motor 30, the transfer arm 80 is at the delivery station over the lehr. After the forming mechanism of the machine has formed the next pair of bottles 13, the button 193 on the timing drum 150 will engage the valve lever 194 of the pilot valve 195. Pilot valve 195 is a poppet type valve similar to the tong operating valve 153. The lever 194 will force the valve member 196 upwardly and connect pressure fluid in chamber 197 to passage 198. The lever 194 is latched in this position by the spring loaded latch 194a. The fluid is conducted through the passage 199 regulated by needle 200, then into passage 201 and conduit 202 connected to pilot port 203 of valve 172. Port 203 connects with an axial passage 204 opening into the right-hand end of the valve chamber 176. The pilot pressure forces the valve spool 179 to the left in FIG. 2 against spring 183 and lands 181 and 182 then connect main pressure fluid from line 174, port 175 and openings 177 to opening 189, annular chamber 188, port 187 and conduit 40. Land 182 of the valve spool blocks openings 190 in the sleeve 178 and blocks exhaust from conduit 40.

Conduit 40 is connected to the upper cylinder port 39 (FIG. 2). Fluid pressure acts on the upper end of piston 41 to move it downwardly and swing the transfer arm 80 in the counterclockwise direction (FIG. 1). Fluid is exhausted from below the piston 41 (FIG. 2) through the radial cylinder port 55, conduit 54, valve port 186 (FIG. 7), annular chamber 185, openings 184 and into valve chamber 176 between lands 180 and 181 on valve spool 179. With the valve spool shifted to the left, the openings 205 in sleeve 178 are uncovered between these lands and fluid is exhausted from the valve through the communicating annular chamber 206 and exhaust port 207.

After relatively slow initial movement of piston 41 in this direction, the tapered pin 45 clears bore 46 (FIG. 2) and movement is accelerated downwardly until the piston covers the radial port 55. At this point the stroke is cushioned by gradually stopping it at the bottom end of the cylinder, since all fluid below the piston must necessarily be exhausted through the bottom-end cylinder port 69. As seen in FIG. 5, this flow of exhaust fluid is restricted by needle valve 63 set in passage 65, because flow is assisting spring 64 to place the movable member 63 of the valve in its extended position to establish the restriction. The exhausted fluid is thus metered to passages 57, 56, and 55 and into conduit 54 for exhaust through motor valve 172, as described.

One important safety feature of the invention is the spring loading of the motor valve for setting it in position to actuate the piston upwardly. If the pilot pressure or pilot valve should fail during operation, the valve will automatically set to return the transfer arm and its associated tongs mechanism over the lehr belt and out of possible interference with the machine molds and related mechanism, such as the invert arm 10. As previously mentioned, such failure of pressure will also cause the tongs to be kept open.

In setting up the transfer device for operation with a particular mold size of ware, the vertical height adjustment is made by the worm gear 28 (FIGS. 4 and 6) to adjust each device vertically in their vertical slideways on the bracket 19a. This is done when the transfer arm 80 and the tongs mechanism thereof are over the mold position (dotted outline in FIG. 1). Sample ware of proper size may be used to make this adjustment. The proper height over the lehr belt may be adjusted by swinging the arm and tongs mechanism over the lehr belt (solid outline in FIG. 1) and in that position adjust the stroke of the motor 30 by adjusting the movable cylinder head-end member 33 of the motor cylinder (FIG. 7) by appropriate turning adjustment of threaded collar 36. If the head-end member 33 is moved downwardly into the cylinder, the bottle position for delivery at the lehr belt will be raised. Moving the head-end member upwardly in the cylinder will result in delivery of the bottle at a lower elevation. Larger ware may obviously be dropped a further distance at release to the lehr belt than smaller ware, but this vertical releasing distance should be kept at a minimum.

The shaft 70, as mentioned, is locked to the frame of the transfer device by the bolted connection on wrench 72 (FIG. 3). To adjust the position of the tongs mechanism to vertical, the wrench 72 may be loosened at its bolted connection 75–76 and rotated manually to the proper setting and then the bolt 76 retightened to retain that adjustment.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. A reciprocating motor connected for driving an oscillatory transfer arm, said motor comprising a fluid-operated cylinder-piston assembly, the piston being connected through a piston rod to drive said transfer arm, the cylinder having closed ends, an adjustable head member within said cylinder and including means adjustably connected to the cylinder for varying the operating length of stroke of the piston, said head member defining a fluid chamber between it and the head end of the cylinder, a fluid port connected to said chamber adapted to alternatively exhaust or introduce fluid therein, an axial cylindrical bore in said head member, a fluid passage in said head member connecting said cylindrical bore and said fluid chamber, an independent passage through said head member defining a connection for flow of fluid between said fluid chamber and the cylinder, an adjustable needle valve in said independent passage for restricting the flow of fluid therethrough, and a tapered axially projecting member on the head-end surface of the piston arranged to register with said cylindrical bore and enter therein near the end of the stroke of the piston, said tapered member progressively restricting the flow of exhaust fluid from the cylinder as it moves farther into said cylindrical bore, whereby the remainder of the stroke of the piston in that direction is cushioned.

2. An apparatus for driving an oscillatory transfer arm comprising a fluid-operated cylinder-piston assembly, the piston being connected through a piston rod to drive said transfer arm, the cylinder having closed ends, a fluid connecting means including a radial fluid port communicating with the cylinder and adapted to alternatively exhaust or introduce fluid therein, said port being spaced axially from the bottom end of the cylinder by a distance less than the axial dimension of the piston, a fluid port in the bottom end of the cylinder, a valve housing defining a valve chamber, the chamber being interposed between said bottom end port and said fluid connecting means, a movable member mounted in said valve chamber and shiftable between extended and retracted positions, a valving passage through the movable member, a needle valve member adjustably mounted in said valve housing and arranged to cooperate with the valving passage and yieldable means in said chamber urging said movable member toward the needle valve for restricting the flow of exhaust fluid from the cylinder when the piston approaches the bottom end of the cylinder, thereby cushioning the end portion of its stroke in that direction.

References Cited in the file of this patent

UNITED STATES PATENTS

| | | |
|---|---|---|
| 1,931,489 | During | Oct. 24, 1933 |
| 2,323,731 | Shetzline | July 6, 1943 |
| 2,636,233 | Perkon | Apr. 28, 1953 |
| 2,853,974 | Hewitt | Sept. 30, 1958 |
| 2,925,243 | Griswold | Feb. 16, 1960 |
| 2,973,744 | Hennells | Mar. 7, 1961 |